United States Patent Office 3,144,429
Patented Aug. 11, 1964

3,144,429
PROCESS OF PREPARING GEL FREE BLOCK CO-
POLYMERS BY USING A NONPOLYMERIZABLE
NITROGEN - CONTAINING COMPOUND; AND
PRODUCTS PREPARED THEREBY
Charles W. Strobel, Bartlesville, Okla., assignor to Phillips Petroleum Company, a corporation of Delaware
No Drawing. Filed Oct. 24, 1960, Ser. No. 64,268
16 Claims. (Cl. 260—45.5)

This invention relates to a method of preparing block copolymers. In another aspect, it relates to block copolymers which are essentially gel free.

It has been disclosed in the copending application of Robert P. Zelinski, Serial No. 796,277, filed March 2, 1959, now abandoned, that novel block copolymers can be prepared by the sequential polymerization of certain monomers in the presence of an organolithium catalyst. The resulting product can be a rubbery or plastic material and in general has utility in applications where plastic polymers or natural and synthetic rubber is used. These block polymers can be molded or extruded and have properties which make them especially suitable for the manufacture of such items as automobile tires, gaskets, containers, pipe and the like.

Block copolymers are formed by polymerizing a monomer onto the end of a polymer, the monomer being introduced in such a manner that substantially all of the co-reacting molecules enter the polymer chain at this point. This method of polymerization has great influence on the properties of the final product. For example, block copolymers differ greatly in their properties from graft polymers or random copolymers even though the weight percent of each of the monomeric materials contained in the polymer may be the same in each case.

Block copolymers made up of a first block of polymer of a conjugated diolefin or a vinyl-substituted aromatic compound and a second block of a polar monomer when formed in the presence of an organolithium catalyst have a tendency to form gel during the polymerization process. This gel is believed to be the result of a certain amount of crosslinking which occurs during the polymerization and in a certain respect represents a polymer which has prematurely cured. It can be seen that the processability of such a polymer is decreased since the gel is insoluble polymer.

According to my invention, a method is provided for preparing block copolymer substantially as described in the above-mentioned copending application but without the formation of gel when the blocks include a first block of polymer of a conjugated diolefin or of a vinyl-substituted aromatic compound and a second block of polymer of a polar monomer, when the block copolymer is formed in the presence of an organolithium catalyst and a hydrocarbon diluent. According to my invention, gel is prevented when polymerizing as described above by introducing a non-polymerizable compound containing the structure

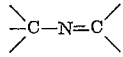

into the polymerization mixture after forming the first said block and before introducing the polar monomer for the formation of the second block. A relatively small amount of the above-described non-polymerizable nitrogen-containing compound introduced at the end of the polymerization which forms the first polymer block enables the second block of the copolymer to be added with essentially no gel formed during the polymerization. The resulting polymer can be recovered and readily processed to produce a variety of useful products as described above and can be cured by conventional systems at the most advantageous time during the fabrication.

It is an object of my invention to provide a method of preparing block copolymers. Another object is to provide an improved method for preparing block copolymers with a minimum of gel being formed in the polymerizate. Still another object is to provide an essentially gel-free block copolymer formed from a first block of polymerized conjugated diolefin or vinyl-substituted aromatic compound plus a second block of polymerized polar monomer. Other objects, advantages, and features of my invention will be apparent to those skilled in the art from the following discussion.

The present invention is concerned with the process for preparing block copolymers from monomers which are used to form a first polymer block and are conjugated dienes of 4 to 12 carbon atoms per molecule and/or vinyl-substituted aromatic compounds. The conjugated dienes include 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl - 1,3 - pentadiene, 1,3-hexadiene, 2-methyl - 1,3 - hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, phenyl-1,3-butadiene, 2,3-diethyl-1,3-butadiene, 2,3-di-n-propyl-1,3-butadiene, 2-methyl-3-isopropyl-1,3-butadiene, and the like. Conjugated dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other to form copolymers, or block copolymers. Block copolymers can be prepared from two or more conjugated dienes by charging one compound initially, allowing it to polymerize, and then adding a second conjugated diene and allowing it to polymerize.

The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these include: 3-methylstyrene (3-vinyltoluene), 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4-benzylstyrene, 4-p-tolylstyrene, 3,5-diphenylstyrene, 2,4,6-tri-tert-butylstyrene, 2,3,4,5 - tetramethylstyrene, 4-(4-phenyl-n-butyl)styrene, 3-(4-n-hexylphenyl)styrene, 4-methyoxystyrene, 3,5-diphenoxystyrene, 3-decoxystyrene, 2,6-dimethyl - 4 - hexoxystyrene, 4-dimethylaminostyrene, 3,5-diethylaminostyrene, 4-methoxy-6-di-n-propylaminostyrene, 4,5 - dimethyl - 1 - vinylnaphthalene, 3-ethyl - 1 - vinylnaphthalene, 6-isopropyl-1-vinylnaphthalene, 2,4-diisopropyl - 1 - vinylnaphthalene, 3,6-di-p-tolyl-1-vinylnaphthalene, 6-cyclohexyl - 1 - vinylnaphthalene, 4,5 - diethyl - 8 - octyl - 1 - vinylnaphthalene, 3,4,5,6-tetramethyl - 1 - vinylnaphthalene, 3,6-di-n-hexyl-1-vinylnaphthalene, 8 - phenyl-1-vinylnaphthalene, 5-(2,4,6-trimethylphenyl) - 1 - vinylnaphthalene, 3,6-diethyl-2-vinylnaphthalene, 7 - dodecyl-2-vinylnaphthalene, 4-n-propyl-5-n-butyl - 2 - vinylnaphthalene, 6-benzyl-2-vinylnaphthalene, 3 - methyl - 5,6 - diethyl-8-n-propyl-2-vinylnaphthalene, 4-o-tolyl - 2 - vinylnaphthalene, 5-(3-phenyl-n-propyl)-2-vinylnaphthalene, 4-methoxy-1-vinylnaphthalene, 6-phenoxy-1-vinylnaphthalene, 3,6-dimethylamino-1-vinylnaphthalene, 7-dihexoxy-2-vinylnaphthalene, and the like.

The above-mentioned monomers are initially polymerized by contact with an organolithium initiator in the presence of a diluent selected from the group consisting of aromatic, paraffinic and cycloparaffinic hydrocarbons so as to form a polymer block. A single conjugated diolefin or vinyl-substituted aromatic hydrocarbon can be selected as the monomer in which case a homopolymer is formed. Alternatively mixtures of the conjugated diolefins can be formed into copolymers or copolymers of the conjugated diolefins with the vinyl-substituted aromatic hydrocarbons can be formed to make up the first polymer block. For example, a conjugated diolefin such as 1,3-butadiene and a vinyl-substituted aromatic hydrocarbon such as styrene can be added to a reaction zone containing the solvent mixture comprising the above-mentioned hydrocarbon diluent. In this case, it is also desirable to have a polar compound present in order that the copolymerization will proceed. The polar compound which can be used in this instance is one which will not polymerize or inactivate the organolithium catalyst. If a polar compound is not introduced to the reaction mixture, conjugated diolefin will polymerize to form either a homopolymer of the diolefin or a copolymer containing at most a very small number of styrene units. After the conjugated diolefin is exhausted, the styrene will then polymerize. It will be apparent to those skilled in the art that by the addition of a polar compound, either initially or during the polymerization of the first block of polymer, a variety of different types of copolymers can be formed to make up the first block of the copolymer produced according to this process.

After the polymerization to form the first copolymer block has proceeded to the desired extent, nitrogen-containing compound which is not polymerizable under the conditions of contacting and contains the structure

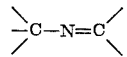

is introduced. Subsequently, the monomer to make up the second block of the copolymer is added to the reaction mixture and the polymerization is continued. These polar monomers include vinylpyridines and vinylquinolines in which the vinyl group is attached to a ring carbon other than a carbon in the beta position with respect to the nitrogen. These pyridine, quinoline or isoquinoline derivatives can contain substituents such as alkyl, cycloalkyl, aryl, alkaryl, aralkyl, alkoxy, aryloxy and dialkylamino groups in which the total number of carbon atoms in the combined substituents does not exceed 12. Any alkyl groups on the alpha or gamma carbons with respect to the nitrogen should be tertiary alkyl groups. Examples of polar monomers applicable include 2-vinylpyridine, 4-vinylpyridine, 3,5-diethyl - 4 - vinylpyridine, 5-methyl-2-vinylpyridine, 5-n-octyl-2-vinylpyridine, 3-n-dodecyl - 2 - vinylpyridine, 3,5-di-n-hexyl-4-vinylpyridine, 5-cyclohexyl - 2 - vinylpyridine, 4-phenyl-2-vinylpyridine, 3,5-di-tert-butyl-2-vinylpyridine, 3 - benzyl - 4 - vinylpyridine, 6-methoxy-2-vinylpyridine, 4-phenoxy-2-vinylpyridine, 4-dimethylamino-2-vinylpyridine, 3,5-dimethyl-4-dimethyl-4-diamylamino-2-vinylpridine, 2 - vinylquinoline, 4-vinylquinoline, 2-tert-butyl-4-vinylquinoline, 3-methyl-4-vinylquinoline, 3-cyclohexyl-4-vinylquinoline, 3-methyl-4-ethoxy-2-vinylquinoline, 1-vinylisoquinoline, 3-vinyliso- quinoline, 4-tert-dodecyl-1-vinylisoquinoline, 3-dimethylamino-3-vinylisoquinoline, 4 - benzyl-3-vinylisoquinoline, 4-phenyl-1-vinylisoquinoline, and the like.

Other polar monomers include acrylic and alkacrylic acid esters, nitriles, and N-,N-disubstituted amides, such as methyl acrylate, ethyl acrylate, butyl acrylate, methyl methacrylate, ethyl methacrylate, propyl methacrylate, butyl methacrylate, methyl ethacrylate, ethyl ethacrylate, isopropyl ethacrylate, acrylonitrile, methacrylonitrile, N,N - dimethylacrylamide, and N,N - diethylmethacrylamide, and the like. Vinylfuran and N-vinylcarbazole can also be used.

The organolithium compound used as a catalyst in the process of this invention corresponds to the formula $R(Li)_x$, wherein R is a hydrocarbon radical selected from the group consisting of aliphathic, cycloaliphatic and aromatic radicals and $x$ is an integer from 1 to 4, inclusive. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5 - trilithionaphthalene, 1,3,5 - trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, dilithio adducts of 2,3-dialkyl-1,3-butadiene, preferably the dilithium adducts of 2,3-dimethyl-1,3-butadiene and dilthium adducts of butadiene and isoprene containing from 1 to 10 diene units per molecule, and the like.

As mentioned hereinbefore, the polymerization is carried out in the presence of a diluent predominantly hydrocarbon and selected from the group consisting of aromatic, paraffinic and cycloparaffinic hydrocarbons. The preferred hydrocarbons of these types are those containing from 3 to 12, inclusive, carbon atoms. Examples of suitable hydrocarbons which can be used include propane, isobutane, n-pentane, isooctane, n-dodecane, cyclopentane, cyclohexane, ethylcyclopentane, dimethylcyclopentane, methylcyclohexane, benzene, toluene, xylene, ethylbenzene, naphthalene, and the like. Mixtures of these various materials can also be employed.

The polar solvent which can be employed in admixture with the hydrocarbon solvent in order to further the polymerization of the conjugated diolefin and a vinyl-substituted aromatic compound should be a compound which will not polymerize and which is inert to the organolithium catalyst. Such polar compounds can be used to increase the rate at which the monomeric materials are polymerized. Examples of such compounds which can be advantageously used are ethers, thio-ethers (sulfides) and tertiary amines. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, tetramethylene oxide (tetrahydrofuran), dimethyl sulfide, diethyl sulfide, di-n-propyl sulfide, di-n-butyl sulfide, methyl ethyl sulfide, dimethylethylamine, tri-n-propylamine, tri-n-butylamine, trimethylamine, triethylamine, N,N - dimethylaniline, N-methyl-N-ethylaniline, N-methylmorpholine, and the like. It is to be understood also that mixtures of these polar compounds can be employed in the practice of the instant invention. The amount of polar compounds used in admixture with the hydrocarbon diluent is usually in the range of 0.005 to 50 weight percent of the total mixture.

The polymerization process of this invention can be carried out at a temperature within the range of −80 to 150° C. However, it is preferred to carry out the process at a temperature in the range of −20 to 80° C. The polymerization reaction can be carried out under autogenous pressures. It is usually desirable to operate at pressures sufficient to maintain the monomeric materials substantially in the liquid phase. The pressure will thus depend upon the particular materials being polymerized, the diluent being employed, and the temperature at which the polymerization is to be carried out. However, higher pressures can be employed if desired, these pressures being obtained by some such method as the pressurization of the reaction with a gas which is inert with respect to the polymerization reaction.

The amount of catalyst which is used in the preparation of the block copolymers of this invention can vary over a rather wide range. In general, at least 0.3 milliequivalent, e.g., 0.3 to 100 milliequivalents, of the organolithium compound per 100 parts by weight of the total monomers to be polymerized is employed in the process. That is, with a monolithium initiator, at least 0.3 millimole is used while with di-, tri-, or tetra-lithium initiators a corresponding smaller amount can be utilized, i.e., 0.15, 0.10 or 0.075 millimole. The upper limit of the amount of the organolithium compound to be used depends primarily upon the desired inherent viscosity of the polymer resulting from the polymerization. The inherent viscosity of the polymer produced decreases with increasing amounts of the organolithium compound. A preferred catalyst level is from 0.6 to 15 milliequivalents of organolithium per 100 parts by weight of total monomers charged.

The polymerization process can be conducted by initially charging the catalyst components and diluent to a suitable pressure-type reaction zone. The selected monomer or monomers to be initially polymerized are charged to this zone and the polymerization can be allowed to proceed until substantially all of this monomer has been polymerized as indicated, for example, by the reduction in pressure which takes place in the reaction zone. It is preferable either to use up substantially all the first monomer charge before continuing with the polymerization or to remove the unpolymerized monomer. This is not absolutely necessary, however, when proceeding according to the present invention.

The polymerization of a conjugated diolefin or the polymerization of a vinyl-substituted aromatic compound in the presence of an organolithium initiator yields a polymer which contains terminal lithium atoms on either one or both ends of the polymer chain, depending upon the initiator employed originally. For example, n-butyllithium yields a polymer containing a lithium atom on only one end of the polymer chain, while a dilithium initiator produces a polymer containing lithium atoms on each end of the polymer chain.

The block copolymers produced in the manner herein described can consist of two-way blocks if the initiator contains only one lithium atom, i.e., a block of the conjugated diene polymer to which is joined a block of the polymer of the polar monomer. When an initiator such as 1,2-dilithio-1,2-diphenylethane is employed, the product will consist of a central block of the conjugated diene polymer with a block of the polymerized polar monomer on each side. It is thus seen that the type of block copolymer produced will be determined by the initiator employed, other things being equal.

After the initial monomer charge has polymerized, pyridine or some other pyridine ring-containing compound or another compound which contains the characteristic structure

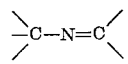

and is not itself polymerizable under the contacting conditions, is introduced to the reaction mixture and this compound undergoes reaction with the lithium-containing polymer which involves addition to the nitrogen-to-carbon double bond of the pyridine or other nitrogen-containing compound, the lithium adding to the nitrogen. This product then serves as the initiator for the last step of the process where the polar monomer is polymerized to give a final block copolymer product which is essentially gel-free. The amount of the pyridine or other nitrogen-containing compound is based on the lithium present. It will generally be in the range from 1 to 25 moles per grame atom of lithium. An amount in excess of stoichiometric is preferred.

The nitrogen-containing compound which is introduced to the polymerization at the end of the polymerization of the first polymer block is selected from the group consisting of heterocyclic nitrogen compounds, N-substituted imines and carbodiimides. This compound must be one which will not polymerize under the conditions of the process and, hence, must be free of $CH_2=<$ groups on carbon atoms other than the carbon in the beta position with respect to the nitrogen in the heterocyclic compounds. It should also be free of substituents which are not inert to the nitrogen and the alkali metal of the reacting materials. In the heterocyclic nitrogen compound, the carbon atom in a beta position with respect to a nitrogen can carry substituents selected from the group consisting of hydrogen, alkyl, aryl, cycloalkyl, aralkyl, alkaryl, alkoxy, aryloxy, dialkylamino and vinylidene, the carbon atoms in the alpha and gamma positions with respect to the nitrogen contain substituents selected from the group consisting of hydrogen, tertiary alkyl, aryl, alkaryl, dialkylamino, alkoxy and aryloxy, while the carbon atoms in all other positions contain substituents selected from the group consisting of hydrogen, alkyl, aryl, cycloalkyl, aralkyl, alkaryl, dialkylamino, alkoxy and aryloxy. Preferably the heterocyclic nitrogen compound does not contain more than 9 ring carbon atoms and the total number of the carbon atoms in all the substituents should not exceed 12. Examples of suitable heterocyclic nitrogen compound are: pyridine, 3-methylpyridine, 3,5-dimethylpyridine, 2-tert-butylpyridine, 2,5-di-tert-butylpyridine, 3-dodecylpyridine, 2,6-dimethoxypyridine, 4-phenoxypyridine, 2-methoxy-5-propylpyridine, 3,5 - dihexylpyridine, 3 - butyl - 5 - octylpyridine, 2,2'-bipyridine, 2,3' - bipyridine, 3,3' - bipyridine, 4,4' - bipyridine, quinoline, 3 - methylquinoline, 2 - tert - octylquinoline, 4 - nonoxyquinoline, 3,6-diisopropylquinoline, 3,5,8 - tri - n - butylquinoline, isoquinoline, 1-pentoxyisoquinoline, 3-tert-decylisoquinoline, 3-decoxyisoquinoline, 4,5-diethylisoquinoline, 1,8-naphthyridine, 1,5-naphthyridine, 1,6-naphthyridine, 1,7-naphthyridine, 2,7-naphthyridine, 3,6-di-n-hexyl-1,8-naphthyridine, 2,7-dimethoxy-1,8-naphthyridine, quinazoline, 1,3,2-benzoxazine, 1,4,2-benzoxazine, 3,1,4-benzoxazine, 2-pyrrolenine, 3-pyrrolenine, 2-isoimidazole, oxazole, thiazole, 1,2,4-dioxazole, indolenine (3-pseudoindole), 2-isobenzazole (pseudo-isoindole), pyrimidine (1,3-diazine), 1,5-pyridine, benzoxazole, purine, 1,3,5-triazine, and the like. Examples of N-substituted imines include the mono- and diimines. Illustrative of such compounds are the following: N-ethylethylidenimine (N-ethylidenethylamine), N-methylbenzylidenimine (N-benzylidenemethylamine), N-hexylcinnamylidenimine, N-decyl - 2 - ethyl-1,2-diphenylbutylidenimine, N-phenylbenzylidenimine (N-benzylidenaniline), N-dodecylcyclohexanimine, N-propyl - 2,5 - cyclohexadieneimine, N - methyl-1-naphthaleneimine, N,N'-dimethylbutanediimine, N,N'-dipentyl - 2 - pentene-1,5-diimine, N-nonyl-1,4-naphthoquinonimine, N,N'diphenyl- 1,4-quinonediimine, N,N'-diphenyl-1,3-indandiimine, and the like. Examples of suitable carbodiimides are: N,N'-dimethylcarbodiimide, N,N'-diethylcarbodiimide, N,N'-diisopropylcarbodiimide, N,N' - di - tert-butylcarbodiimide, N,N'-di-n-hexylcarbodiimide, N,N' - dioctylcarbodiimide, N,N'-didecylcarbodiimide, N,N'-methylethylcarbodiimide, N,N'-ethylheptylcarbodiimide, N,N'-dicyclopentylcarbodiimide, N,N'-dicyclohexylcarbodiimide, N,N'-diphenylcarbodiimide, N,N'-di-2 - naphthylcarbodiimide, N,N'-di-4-tolylcarbodiimide, N,N'-dibenzylcarbodiimide, N,N'-nonyleicosylcarbodiimide, and the like. It should be pointed out that as long as the compound is free of active polymerizable groups, the substituents on the nitrogen in the imines and diimines or the organic radical to which both nitrogens are joined in the diimines are not particularly significant from the standpoint of the function of the process. The same is true for the carbodiimides. It is the

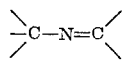

structure that is important in these compounds, the reaction occurring at the —N=C<. It is preferred that these imines and carbodiimides contain not more than 30 carbon atoms per molecule. The nitrogen substituents are preferably alkyl, cycloalkyl or aryl groups which can in turn be substituted with alkoxy, aryloxy or dialkylamino groups. As pointed out above, these compounds should not contain a $CH_2=C<$ group nor should they contain reactive substituents.

After adding the non-polymerizable nitrogen-containing compound above described, sufficient time is allowed for the reaction of the nitrogen compound with the lithium-terminated first polymer block. In general, only a very short time is required although the time of reaction is dependent upon the temperature. Normally from 5 to 10 minutes or less is sufficient when the polymerization temperature is about 50° C. If the temperature is about 50° C. or higher, too long a contacting period prior to the addition of the polar monomer results in splitting out lithium hydride and inactivation of the initiator. At lower temperatures, the contacting time can be substantially longer, for example, up to an hour or even longer.

The polar monomer is then introduced to the polymerization mixture and the polymerization to form the second polymer block is continued. A single polar monomer can be introduced or a mixture of such monomers can be used to form a copolymer as the second block of the block copolymer.

Various materials are known to inactivate the catalyst composition of the invention. These materials include water, mercaptans, and primary and secondary amines. It is highly desirable, therefore, that the monomers be free of these materials as well as other materials which tend to inactivate the catalyst. Any of the known means for removing such contaminants can be used. Also, it is preferred that the diluent used in the process be substantially free of impurities such as water, oxygen and the like. In this connection, it is desirable to remove air and moisture from the reaction vessel in which the polymerization is carried out. Although it is preferred to carry out the polymerization under anhydrous or substantially anhydrous conditions, it is to be understood that some water can be tolerated in the reaction mixture. However, the amount of water which may be tolerated in the mixture is insufficient to completely inactivate the catalyst.

After the completion of the polymerization reaction, or after the polymerization has been carried out to the desired degree, the total reaction mixture is then treated to inactivate the catalyst and recover the polymer product. While it is to be understood that any suitable treating method can be employed, one method for accomplishing the desired treatment comprises adding a catalyst-inactivating material such as water, an alcohol, e.g., ethyl alcohol or isopropyl alcohol, an organic or inorganic acid or the like. It is generally preferred to add only an amount of the catalyst-inactivating material which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst-inactivating material and the antioxidant, the polymer present in the solution can then be precipitated by the addition of an excess of a material such as ethyl alcohol or isopropyl alcohol. It is to be understood that deactivation of the catalyst and precipitation of the polymer can be accomplished in a single step. The precipitated polymer can then be recovered by filtration, decantation, or the like. In order to further purify the polymer, the separated polymer can be redissolved in a suitable solvent and again precipitated by the addition of an alcohol. Thereafter, the polymer is again recovered by a suitable separation means, as indicated hereinbefore, and dried. Any suitable hydrocarbon solvent such as hereinbefore mentioned can be used in this purification step to redissolve the polymer. The diluent and alcohol can in all cases be separated, for example, by fractional distillation, and reused in the process. As hereinbefore mentioned, it is within the scope of the invention to utilize an antioxidant in the process to prevent oxidation of the polymer. The antioxidant can be added to the reaction mixture prior to precipitation of the polymer, to the solution of redissolved polymer, or to the diluent in which the polymer is to be subsequently redissolved.

The advantages of my invention will be more apparent from the following examples. The specific conditions and materials employed in the examples are presented as being typical and should not be construed as limiting my invention unduly.

*Example I*

A block copolymer consisting of a central polybutadiene block with a poly-2-vinylpyridine block on each end of the polymer chain was prepared using the following quantities of materials:

Cyclohexane, parts by weight _____ 780
1,3-butadiene, parts by weight _____ 87.5
2-vinylpyridine, parts by weight _____ 12.5
1,2-dilithio-1,2-diphenylethane, mmoles _____ 6
Pyridine, mmoles _____ 40

Cyclohexane was charged to the reactor which was then purged with nitrogen. 1,2-dilithio-1,2-diphenylethane was added as a solution in a 9:1 volume mixture of diethyl ether and tetrahydrofuran, followed by the butadiene. Polymerization was effected at 50° C. After polymerization had continued for one hour, pyridine was added and the mixture was shaken for about 5 minutes. The 2-vinylpyridine was then introduced and the mixture was again shaken. Most of the polymerization occurred in the first 10 minutes. The polymer solution increased in viscosity after addition of the 2-vinylpyridine but no gel formed. After about one hour, the block copolymer was recovered by coagulation in isopropanol.

A benzene solution of the polymer was titrated with perchloric acid in acetic acid. Results showed 51.2 millimoles of pyridine base, or 5.5 grams, per 100 grams polymer, or the following block copolymer composition expressed on a weight basis: 2.75 poly-2-vinylpyridine/94.5 polybutadiene/2.75 poly-2-vinylpyridine.

*Example II*

A series of runs was made in an attempt to prepare block copolymers of butadiene with 2-vinylpyridine, using variable monomer ratios. Several runs were made in accordance with the following recipe:

Cyclohexane, parts by weight _____ 1060
1,3-butadiene, parts by weight _____ Variable
2-vinylpyridine, parts by weight _____ Variable
1,2-dilithio-1,2-diphenylethane, mmoles ____ 20

Butadiene was polymerized at 50° C. using the charging procedure described in the foregoing run. After a 1-hour polymerization period, the vinylpyridine was added and the reaction continued for one hour. The monomer ratio and appearance of the product in each of four runs is shown below:

| Run No. | Butadiene/2-Vinylpyridine Monomer Ratio | Appearance of Product |
|---|---|---|
| 1 | 90/10 | Solid. |
| 2 | 95/5 | Do. |
| 3 | 98.5/1.5 | Sticky but firm. |
| 4 | 99/1 | Do. |

The polymer solutions all contained gel. As the amount of 2-vinylpyridine increased, the amount of gel increased.

As shown by the above examples, when proceeding according to this invention, with the addition of pyridine between the formation of the first and second blocks of the copolymer, the formation of gel is avoided whereas there is a strong tendency to form gel in the production of this block copolymer if pyridine or another nitrogen-containing compound as above-described is not added.

It will be apparent to those skilled in the art from the above discussion that various modifications can be made in my invention without departing from the spirit or scope thereof.

I claim:

1. A process for preparing block copolymers which comprises initially contacting first monomeric material selected rfom the group consisting of conjugated dienes having 4 to 12 carbon atoms per molecule and vinyl-substituted aromatic compounds selected from the group consisting of substituted and unsubstituted styrene, 1-vinylnaphthalene and 2-vinylnaphthalene in which any substituents are selected from the group consisting of alkyl, cycloalkyl, aryl, alkaryl, aralkyl, alkoxy, aryloxy, and dialkylamino in which the total carbon atoms of the combined substituents does not exceed 12 with a polymerization initiator having the formula $R(Li)_x$ wherein R is selected from the group consisting of aliphatic, cycloaliphatic and aromatic radicals and $x$ is an integer of 1 to 4 in the presence of a hydrocarbon diluent selected from the group consisting of aromatic, paraffinic and cycloparaffinic hydrocarbons so as to form a polymeric block containing said first monomer, contacting said polymeric block with a non-polymerizable nitrogen-containing compound containing the structure

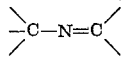

and otherwise free of substituents reactive with the lithium in said polymeric block and selected from the group consisting of heterocyclic nitrogen compounds containing up to 9 ring carbon atoms and up to 12 carbon atoms in substituents selected from the group consisting of alkyl, cycloalkyl, aryl, alkoxy and aryloxy radicals and N-substituted monoimines, N,N'-disubstituted diimines and N,N'-disubstituted carbodiimides containing up to 30 carbon atoms and in which each N-substituent is selected from the group consisting of alkyl, cycloalkyl, and aryl radicals, and subsequently contacting the resulting polymeric block with a polar monomer selected from the group consisting of substituted and unsubstituted vinylpyridines, vinylquinolines and vinylisoquinolines in which any substituents are selected from the group consisting of alkyl, cycloalkyl, aryl, alkaryl, aralkyl, alkoxy, aryloxy, and dialkylamino, the total carbon atoms in the combined substituents does not exceed 12, and in which the vinyl group is attached to a ring carbon other than a beta carbon and any alkyl groups on the alpha or gamma carbons with respect to the nitrogen are tertiary alkyl groups; lower alkyl acrylates, methacrylates and ethacrylates; acrylonitrile, methacrylonitrile, N,N-dimethylacrylamide, N,N-diethylmethacrylamide, vinylfuran and N-vinylcarbazole.

2. A process for preparing block copolymers which comprises contacting a conjugated diene having 4 to 12 carbon atoms per molecule with a polymerization initiator having the formula $R(Li)_x$ wherein R is selected from the group consisting of aliphatic, cycloaliphatic and aromatic radicals and $x$ is an integer of 1 to 4 in the presence of a predominantly hydrocarbon diluent selected from the group consisting of aromatic, paraffinic and cycloparaffinic hydrocarbons so as to form a first polymeric block, adding to the polymerization mixture a pyridine compound having up to 12 carbon atoms in saturated hydrocarbon substituents, and thereafter introducing to the mixture a polymerizable vinylpyridine compound having up to 12 carbon atoms in saturated hydrocarbon substituents, and continuing the polymerization to form a second polymeric block, the polymerization temperature being in the range of —80 to 150° C. and the pressure sufficient to maintain the diluent substantially in the liquid phase.

3. The process of claim 1 wherein said first monomeric material includes 1,3-butadiene and said second monomer is 2-vinylpyridine.

4. The process of claim 1 wherein said first monomeric material includes 1,3-butadiene and said second monomer is acrylonitrile.

5. The process of claim 1 wherein said nitrogen-containing compound in pyridine.

6. The process of claim 1 wherein said first monomeric material includes 1,3-butadiene which is copolymerized with styrene in the presence of a non-polymerizable polar solvent which is inert with respect to said polymerization initiator.

7. The process of claim 1 wherein said first monomeric is material includes styrene.

8. The process of claim 1 wherein said polymerization initiator is n-butyllithium.

9. The process of claim 1 wherein said polymerization initiator is 1,2-dilithio-1,2-diphenylethane.

10. The process of claim 1 wherein said polymerization initiator is a dilithium adduct of 2,3-dimethyl-1,3-butadiene.

11. A process for preparing block copolymers which comprises initially contacting 1,3-butadiene with n-butyllithium in the presence of a hydrocarbon diluent selected from the group consisting of aromatic, paraffinic and cycloparaffinic hydrocarbons so as to form a block of polymerized 1,3-butadiene, contacting said polymeric block with from 1 to 25 mols of pyridine per gram atom of lithium in the system, subsequently introducing 2-vinylpyridine in contact with said polymeric block, said contacting occurring at a temperature in the range of —20 to 80° C. and at sufficient pressure to maintain said diluent in the liquid phase, and recovering an essentially gel-free block copolymer of 1,3-butadiene and 2-vinylpyridine.

12. A process for preparing block copolymers which comprises initially contacting 1,3-butadiene with 1,2-dilithio-1,2-diphenylethane in the presence of a hydrocarbon diluent selected from the group consisting of aromatic, paraffinic and cycloparaffinic hydrocarbons so as to form a block of polymerized 1,3-butadiene, contacting said polymeric block with from 1 to 25 mols of pyridine per gram atom of lithium in the system, subsequently introducing 2-vinylpyridine in contact with said polymeric block, said contacting occurring at a temperature in the range of —20 to 80° C. and at sufficient pressure to maintain said diluent in the liquid phase, and recovering an essentially gel-free block copolymer of 1,3-butadiene and 2-vinylpyridine.

13. A process for preparing block copolymers which comprises initially contacting isoprene with a dilithium adduct of 2,3-dimethyl-1,3-butadiene in the presence of a hydrocarbon diluent selected from the group consisting of aromatic, paraffinic and cycloparaffinic hydrocarbons so as to form a block of polymerized isoprene, contacting said polymeric block with from 1 to 25 mols of quinoline per atom of lithium in the system, subsequently introducing acrylonitrile in contact with said polymeric block, said contacting occurring at a temperature in the range of −20 to 80° C. and at sufficient pressure to maintain said diluent in the liquid phase, and recovering an essentially gel-free block copolymer of isoprene and acrylonitrile.

14. An essentially gel-free block copolymer prepared by the method of claim 1.

15. An essentially gel-free block copolymer prepared by the method of claim 11.

16. An essentially gel-free bock copolymer prepared by the method of claim 14.

References Cited in the file of this patent

UNITED STATES PATENTS

| | | |
|---|---|---|
| 2,666,042 | Nozaki | Jan. 12, 1954 |
| 2,846,411 | Meyer et al. | Aug. 5, 1958 |
| 2,913,444 | Diem et al. | Nov. 17, 1959 |
| 2,991,258 | Haward et al. | July 4, 1961 |
| 3,031,432 | Kern | Apr. 24, 1962 |

OTHER REFERENCES

Gaylord et al.: "Linear and Stereospecific Addition Polymers," pages 141, 227, 392, 464–466, 471, 513, 514, and 525, 393, Interscience Pub., New York, 1959.